United States Patent Office 3,561,876
Patented Feb. 9, 1971

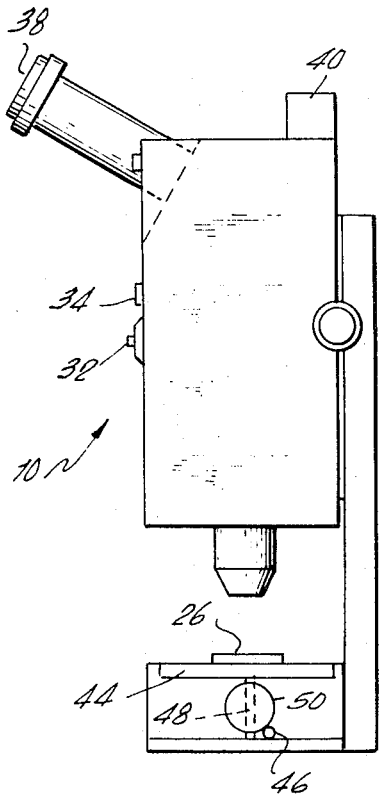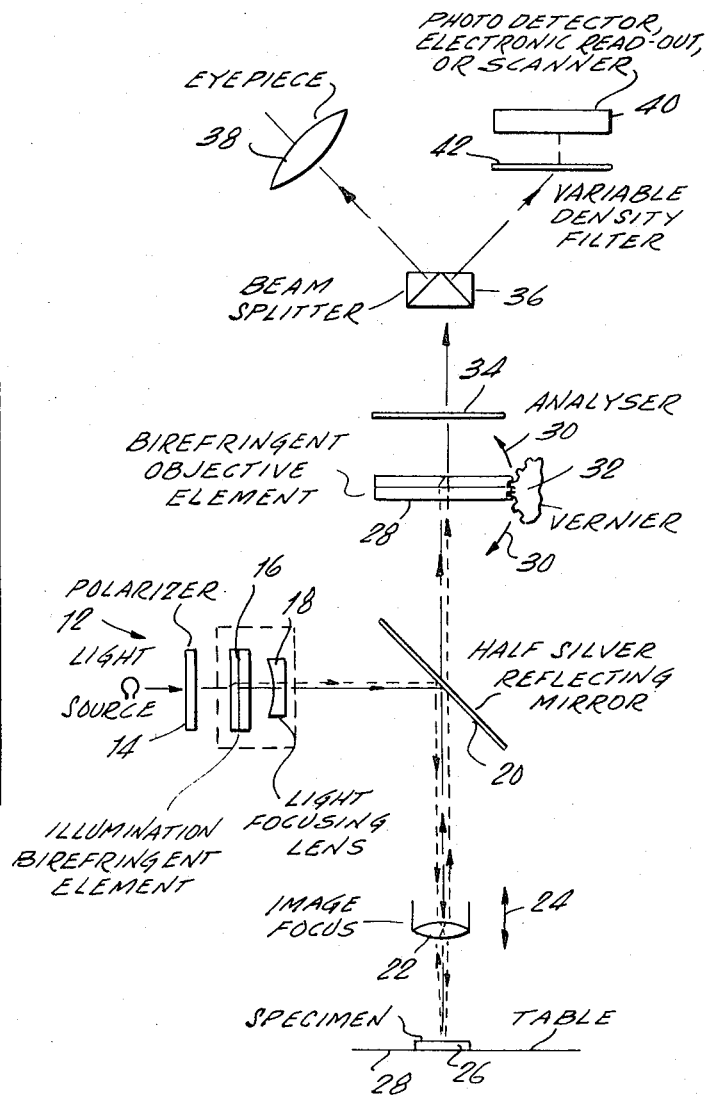
FIG.1
FIG.2
INVENTOR.
ROBERT HOFFMAN

3,561,876
DETECTING AND MEASURING APPARATUS
USING POLARIZATION INTERFEROMETRY
Robert Hoffman, 17 Copper Beech Place,
Merrick, N.Y. 11566
Filed Mar. 11, 1968, Ser. No. 712,011
Int. Cl. G01b 9/02; G02b 21/06
U.S. Cl. 356—106
1 Claim

ABSTRACT OF THE DISCLOSURE

A detecting and measuring system using polarization interference optics comprising a source of polarized coherent illumination, an object in the coherent light field, an objective focusing lens system and a birefringent element or elements for splitting and displacing light rays. Means are provided for altering compensation by changing position of birefringent element or by changing the angle of coherent light source. Analyser means are provided for causing interference of displaced light rays as is a photo detector means for electrically indicating the minute changes in light intensity that result from the interfering light rays. Beam splitting means are provided for directing interfering rays from the analyser to the photo detector and/or to an eye piece. Variable density filter means are placed between the analyser means and the photo detector means to control level of light intensity. There may be provided coupling means for coupling motion of an external object to the stage or compensator for detecting minute motions of the object.

---

This invention relates to an apparatus for detecting very small phase differences in polarization interference of light by measuring the change in light intensity by photo-electrical means between the minimum and maximum of one interference fringe or through several orders of fringes.

The invention permits the accurate measure of optical path differences between two points over a range of less than 1A° to several microns by electronic readout.

The optical system employed is one that produces an image, the whole or portion of which represents the interference of wave fronts where the path difference is a portion of a fringe. This occurs when coherent light is polarized and sheared. The distance of shear may produce complete or partial separation of the image. Ref: (1) Francon, M.; Progress in Microscopy; Row, Peterson and Company; Elmsford, N.Y. 1961; (2) Van Heel, A.C.S., (editor) Advanced Optical Techniques, North Holland Publishing Co., Amsterdam 1967.

In carrying out the invention the path difference may be controlled by a birefringent element positioned relative to the specimen. This produces an intensity change that is directly due to path difference. When the light intensity is detected and recorded it represents a path or phase difference between the two interfering wave fronts.

Light intensity varies as the phase or path difference between the interfering light rays varies, as well as when there is a deviation from the direction of shear of the birefringent element.

The present state of the art of measuring small optical path differences relies upon counting interference fringes, measuring proportional fringe shifts and more lately, by comparing interference color on Newton's Color Scale. This invention brings a new and novel method of coupling a sensitive photo detector to measure the variations in light intensity within one fringe. This is possible because compensated polarization interferometry permits any portion of a fringe to occupy a visible field.

Classically, the maximum and minimum of light intensities that reveal interference fringes has been well documented in the literature. But heretofore the measurement of light intensity *within one fringe* has not been used as a measure of phase difference or optical path differences, although it has been theoretically calculated.

With the advent of polarization interferometry, colors in the visual field were matched visually with Newton's Color Scale as a measure of path difference. However, this procedure was subjective and the minimum color change that could be detected was the result of an optical path difference of $.040\mu$ or a color change from black to iron grey using crossed polars.

Other colors could be produced in accordance with Newton's Color Scale and represented several orders of fringes. The present state of the art compared one color against other colors in the field and this then was a relative measure of path difference.

These colors are produced because the light rays from one point traveled a different length from another point and were made to interfere. These points may be widely separated as in the full duplication method (see Francon) or very close together as in the partial separation method. It was then necessary to have more than one color in the field for comparison and therefore, the specimen could not be uniform.

It is known that when compensation is adjusted path differences are introduced in the light field which then produces colors in accordance with Newton's Color Scale.

At this point, this invention introduces a new and novel use of compensation. A uniform surface when placed in the light field appears to have a uniform color. However, if the surface angle is changed (for reflected light system using the differential method) there is a corresponding color change across the entire field. The colors that are produced as the angle of the reflective surface changes are exactly those that occupy fringes in white light. This invention also couples a light sensitive detector to measure the light intensity of the color in the field. Experiments confirmed that the light intensity varied from minimum to maximum as the colors changed from 0 to ½ fringe. However, after standardizing the maximum and minimum each light intensity value is a measure of path difference. This invention now combines this information and couples the above mentioned reflective surface to some mechanical movement. This mechanical movement can now be measured with extreme accuracy by measuring the light intensity variation through the interference system.

The same principles of coupling a sensitive photo detector to a transmission system using the differential method is intended in this invention.

Polarization interferometry employs polarizers to polarize the light source and birefringent elements to split and displace the light rays. Three systems of splitting have been described in the literature; namely, the full duplication or complete splitting, the partial splitting and an axial splitting system. The cut and arrangement of the birefringent elements contribute to the particular system and are described in the literature. The complete splitting system detects height differences by the production of colors. The partial splitting or as is known as the differential method detects slopes in color differences. The axial system also measures height differences.

In accordance with the concepts of this invention there is provided a sensitive photo detector, and instead of the usual method of reading color differences, light intensity variation are detected. This transforms the highly subjective and inaccurate method of color reading to an ultrasensitive, objective method for quantification of optical path difference.

Since birefringent elements split and displace light rays, their optical response is directional. This invention introduces a new use for this directionality. As an object in the light field is rotated so that the two points to be measured are no longer in the direction that the light rays are split, the path difference decreases. This effect is periodic for 360 degrees of rotation. We have stated above that a change in the path can be photo electrically detected. If the rotation of the stage can be mechanically coupled to a machine, the movement of that machine is measured.

An example for using directionality as a means for producing planeness of optical flats is given as follows: Using the differential method with reflected light, a reflective wedge is rotated in the light field. As the direction of the slope approaches the direction of light displacement, maximum light intensity for that path difference is detected. When the slope is at right angles to the direction of light displacement, minimum light intensity for that slope is detected. If during rotation the slope is altered so that the light intensity remains constant, Then the surface is normal to the optic axis. This is an extremely sensitive and accurate means for leveling and detecting path difference. This is not possible by observing colors in accordance with Newton's Color Scale as is the present state of the art.

Transmission systems using the same principles of polarization interferometry with the addition of this invention are intended for those as are applicable by transmission systems.

It is also intended by this invention to photoelectrically scan a non-uniform field and determine the minute changes of light intensity. This invention then enables by integration to plot a contour based on light intensity variations as a measure of path difference.

All measurements may be made using monochromatic light instead of white light. The light intensity curve is a sine curve with maximum and minimum almost exactly repetitive in value for at least three (3) orders using monochromatic light. In white light, maximum and minimum changes are noted in Table One.

The intensity curve for monochromatic light has a more rapid change of slope at the minimum and maximum than the curve for white light. It is also important to realize that the point of inflection of the intensity curve is at multiples of ½ fringe starting at ¼ fringe. The point of inflection is the most linear and sensitive portion of the curve. As an example, if a reflective surface is tilted from the normal and at a position where compensation is 100% then with crossed polars there is a minimum light intensity. Let us say it takes an angle of 30 seconds to change light intensity 1 unit. However, if the position of the compensation is set to 50% light intensity for that specimen that is ¼ fringe from complete compensation. A change of 30 seconds produces a change in light intensity of 5 units. At 100% light intensity the change in light intensity for 30 seconds is again 1 unit.

A further intent of this invention is to use the birefringent element in the differential system as a phase detector in laser phase modulation communications and ranging. The slightest change in position will alter the phase or compensation and can be detected by the sensitive photo detector. In summary then, this system can detect the minutest changes in height or slope and is more sensitive than the prior art of fringe counting, displacement or color methods. For practical purposes fringe displacement can reveal 1/20 wavelength path differences. This present system can detect less than 1/1000 wavelength or at least 1 A. path difference.

The present invention enables determination of the angle of a wedge, enables tables to be leveled with a high degree of accuracy, detects the planeness of optical flats to a greater degree of flatness, with greater accuracy than current practice, and with greater ease.

This invention also permits the determination of restoration forces and elastic memory of materials, their rate of recovery, and the extent of deformation.

The invention also permits determination of the change in direction, either linear or radial, of one point or object in space in respect to another and enables it to be fixed closely in space in three dimensions with an exceptionally high degree of accuracy.

This system can be employed as a phase detector in phase modulation light communications.

The system can be applied to optical ranging; also, the principle described herein can be used to detect alterations in intensity of illumination. This system, coupled to a recorder and integrator, will provide an accurate contour map of surfaces under study. Its application to chemical microscopy, biological analysis, physical analysis and polarization interferomety is dependent only upon the configuration of the test model to reveal phase or path differences.

To illustrate this invention, the differential interference optical system which is sensitive to minute variations of surface slopes is described (See Francon). This system produces interference colors which correspond with Newton's Color Scale. According to Francon, color changes were observed and were a measure of path difference. The sensitivity of this system is increased by the new and novel means for detecting the variation in intensity of light within the first order of an interference. The sensitivity of this system is such that it can detect extremely minute phase changes. Changes in intensity may be read from a photo-electric detector placed in the optical path.

These, together with the various ancillary objects and features of the invention which will become apparent as the following specification proceeds are attained by this detecting and measuring device utilizing differential interference, a preferred embodiment being shown in the accompanying, drawing, by way of example only, wherein:

FIG. 1 is an elevational view of the optical system used in the present invention; and, FIG. 2 is a schematic diagram of the component optics employed in the invention.

With continuing reference to the accompanying drawing, wherein like reference numerals designate similar parts throughout the various views, reference numeral 10 generally designates an optical system constructed in accordance with the concepts of the invention. The optical system 10 which provides coherent illumination and may be in the form of a laser beam or may be produced by an ordinary illumination source 12 and a compensated polarization interference system which includes a polarizer 14, a birefringement element 16 (example—Savart polariscope), an illumination focus system 18, semi-reflecting mirror 20 (for reflected light systems), objective lens system 22, objective birefringnent element 28 (Savart polariscope), analyser 34. Coherent illumination is produced when two (2) identical Savart polariscopes are oriented one at 180 degrees to the other and placed between a polarizer and analyser.

The light source is directed onto a half silver reflecting mirror 20 and thence through an objective 22 capable of adjustment in the direction of the optic axis as indicated by arrows 24.

The specimen 26 is mounted on a table 44 that is rotatable through 360 degrees and with X, Y, Z, adjustments. Above the mirror 20 is an objective birefringent element 28 that is tiltable in the directions of arrows 30 and coupled to a fine vernier system 32 of any desired construction. The birefringent element employed is a Savart plate which consists of two identical plane parallel plates of quartz cut at 45 degrees to the optical axis and cemented together with their principle sections at right angles to each other. A horizontally rotatable analyzer is aligned above the objective element 28.

A beam splitting prism 36 is provided above the analyzer for directing light to an eye piece 38 and also through a photo detector 40 through a variable density filter 42 for control of the intensity of light reaching the photo detector 40. The photo detector provides for electrical readout or scan for an indication of light intensity.

As shown in FIG. 2, an incident ray from the light source after passing through polarizer 14 is split into two coherent rays and is displaced by the birefringent element 16. These rays vibrate perpendicularly to each other and are laterally displaced from each other. These two parallel coherent rays are collected by the lens 18, deviated by the half reflecting mirror 20 and converged by the focusing lens 22 on the specimen 26. The two (2) rays emerging from the surface of specimen 26 pass again through lens 22 and then through semi-reflecting mirror 20 and are recombined as they pass objective birefringent element 28. Compensation is adjustable by tilting objective element 28 by using vernier 32. The recombined rays on passing the analyser 34 interfere. Interference occurs between waves that are out of phase.

If a reflected plane surface is tilted relative to objective birefringent element a path difference is produced. The intensity of light is proportional to the maximum for that specimen. This intensity is detected and recorded. If the tilt is changed the intensity changes. The difference in intensity may be calibrated into slope or actual path difference. The tilting surface may be mechanically coupled to any system for measuring change. The rotation of the objective birefringent element 28 can be calibrated to path difference or slope and the electrical readout through photo detector 40 can be calibrated.

If the specimen is a curved reflected surface and coupled to an external object, then the linear translation of the external object can be detected and measured by the differential method.

The mechanical coupling to stage 44 is through a vertical axis 48 for rotation of 44 and a vertical wheel 50 for tilting 44. Either 48 or 50 can be engaged by a horizontal coupling member 46. The combinations of such means provides for rotating or tilting 44 in response to some external object.

If the specimen has other than a uniform flat surface, the slope of the surface will be colored as described by the Newton Color Scale against a preselected background. The light intensity of illumination for each color from the Newton Color Scale can be easily detected by scan techniques obtained and hence the degree of slope can be calculated by electrical readout as can be seen from the following table:

TABLE I

| Light (percent) | | Path difference, $\mu$ | Slope. Color (Newton) degrees crossed polars | Orders |
|---|---|---|---|---|
| White | Monochromatic | | | |
| 0 | 0 | .000 | 0 Black | 0 |
| 10 | | .119 | 0.90 | |
| 50 | 50 | .158 | 1.16 Greyish blue | 1/4 |
| 100 | 100 | .306 | 2.31 Light yellow | 1/2 |
| 25 | 0 | .589 | 4.44 Indigo | 1 |
| 75 | 100 | .910 | 6.86 Pure yellow | 3/2 |
| 50 | 0 | 1.151 | 8.70 Indigo | 2 |

NOTE.—Formula:

$\frac{d\Delta}{dX} \times \frac{57.3}{2}$ radians = degrees $\Delta D$=path difference ($\mu$)
X=shearing distance ($\mu$)
4×objective (NA 0.1) ; X=3.8 $\mu$.

A latitude of modification, substitution and change is intended in the foregoing disclosure and in some instances, some features of the invention will be employed without a corresponding use of other features. Accordingly, it is appropriate that the appended claims be construed broadly and in a manner consistent with the spirit and scope of the invention herein.

I claim:
1. A detecting and measuring apparatus using polarization interferometry comprising: a coherent light source and including in optical sequence a polarizer, a birefringent element for splitting and displacing light rays from said source and a lens for collecting said light rays, a semi-transparent mirror oriented to reflect said light rays perpendicularly from the path of said source onto said specimen and an objective lens positioned in the optical path between said specimen and said semi-transparent mirror, a second birefringent element positioned to receive and recombine the light rays that are reflected from said specimen and transmitted back through said semi-transparent mirror, means for tiltably adjusting said second birefringent element for effecting compensation, a polarization analyzer receiving said recombined light rays and causing them to interfere, photo detector means for electrically detecting the light intensity of the interfering light rays and indicator means for displaying a signal indicative of said intensity, a beamsplitter positioned between said photo detector means and said analyzer for directing a portion of the light from said analyzer to said photo detector means along one path, a variable density filter between said beamsplitter and said photo detector means and an eyepiece positioned to receive light from said analyzer along another path from said second semi-transparent mirror.

References Cited

UNITED STATES PATENTS

| | | | |
|---|---|---|---|
| 2,601,175 | 6/1952 | Smith | 350—12 |
| 2,924,142 | 2/1960 | Nomarski | 350—12X |
| 3,146,294 | 8/1964 | Koester et al. | 356—106X |
| 3,162,713 | 12/1964 | Koester et al. | 356—106X |
| 3,171,034 | 2/1965 | Tomasulo et al. | 250—211 |
| 3,229,564 | 1/1966 | Meltzer | 356—210 |
| 3,419,726 | 12/1968 | Olsen | 250—239X |

FOREIGN PATENTS

| | | | |
|---|---|---|---|
| 710,495 | 6/1954 | Great Britain | 350—12 |

RONALD L. WIBERT, Primary Examiner

T. MAJOR, Assistant Examiner

U.S. Cl. X.R.

350—12